UNITED STATES PATENT OFFICE.

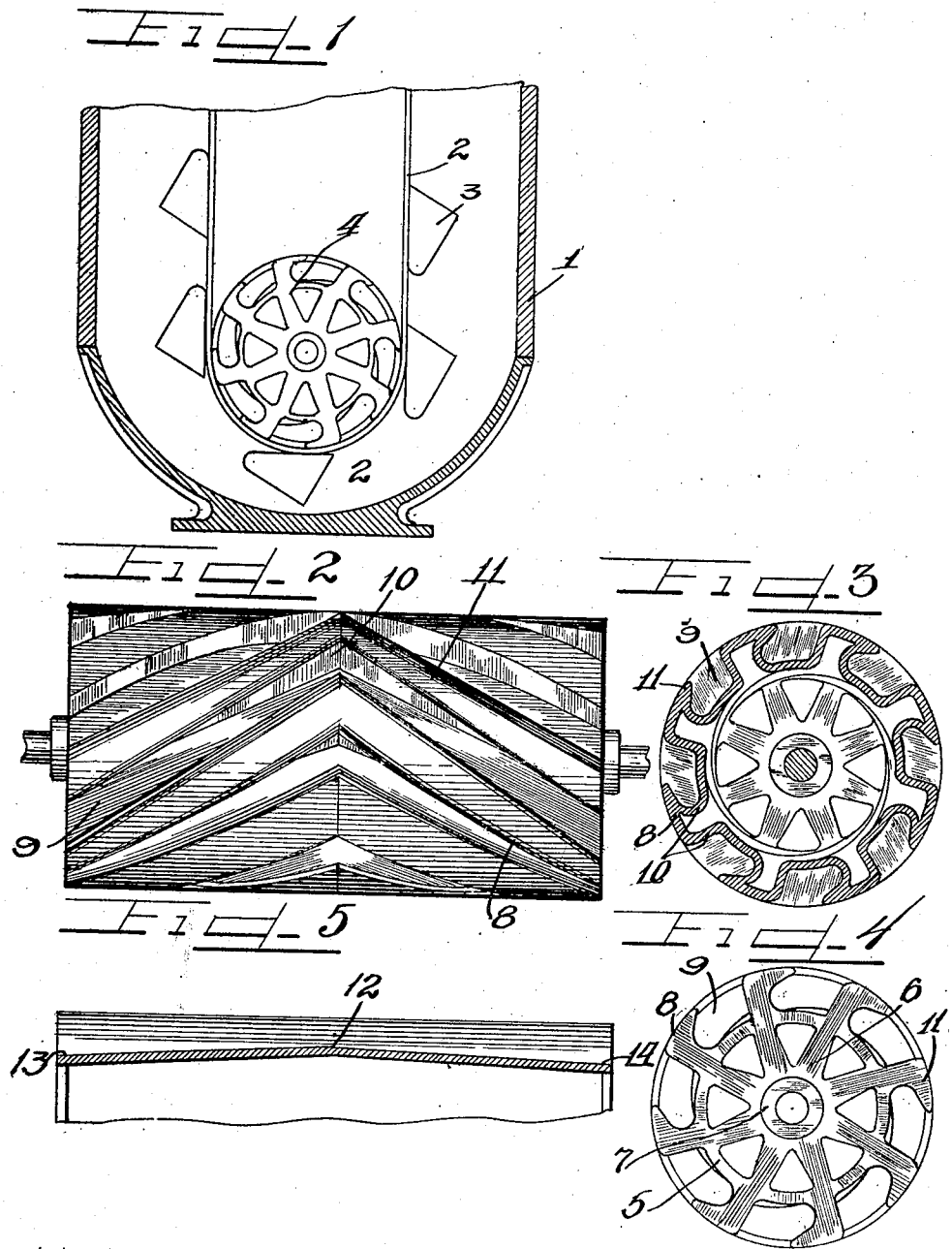

WILLIAM J. BLACK, OF CHICAGO, ILLINOIS.

SELF-CLEANING PULLEY.

1,335,421.  Specification of Letters Patent.  Patented Mar. 30, 1920.

Application filed August 30, 1917. Serial No. 188,941.

*To all whom it may concern:*

Be it known that I, WILLIAM J. BLACK, a citizen of the United States, and a resident of the city of Chicago, in the county of Cook and State of Illinois, have invented certain new and useful Improvements in Self-Cleaning Pulleys; and I do hereby declare that the following is a full, clear, and exact description of the same, reference being had to the accompanying drawings, and the numerals of reference marked thereon, which form a part of this specification.

In the handling of coal, crushed rock, and many other substances by means of belt bucket conveyers, much loss has been occasioned by material falling upon the pulley which becomes lodged between the belt and pulley with the result that the belt is punched full of holes or greatly worn, and soon breaks, requiring a new section of belting or an entirely new belt. In either case, considerable loss is occasioned.

It is an object of this invention to provide a self-cleaning pulley in which any material falling thereon drops into suitable grooves in the pulley and is automatically discharged from the ends of the pulley without contacting the belt.

It is also an object of this invention to provide a self-cleaning pulley in which the pulley as a whole is inclined from the middle toward the ends, in which angular ribs are provided on the pulley providing discharge grooves therebetween and in which the walls of the ribs are also spiral shaped to further aid in quickly discharging any material that may fall onto the pulley, before any damage is occasioned to the conveyer.

It is further an object of this invention to provide a pulley of the class specified which is provided with discharge grooves having a high pitch, and in which the belt conveyer at all times has a bearing on several ribs to thereby prevent the same from collapsing into any groove.

Other and further important objects of this invention will be apparent from the disclosures in the specification and drawings.

The invention (in a preferred form) is illustrated in the drawings and hereinafter more fully described.

On the drawings:

Figure 1 illustrates the use of a belt conveyer provided with a pulley embodying my invention.

Fig. 2 is a plan view of the pulley.

Fig. 3 is a transverse vertical section of the pulley.

Fig. 4 is an end view thereof.

Fig. 5 is a view illustrating the inclination of the pulley as a whole from the middle to the ends and is taken along any rib or groove.

As shown on the drawings:

1, indicates any bin or receptacle from which the material is to be delivered, and 2 indicates a conveyer of any suitable type provided with buckets 3. The conveyer is trained about the idle pulley 4, embodying my invention. Said pulley comprises a drum or ring 5, having a spider 6, connected thereto which has central bearing sleeves 7, integral therewith.

Cast or formed integral with the drum or rings 5, are ribs 8, each of which inclines from the center at a sharp angle downwardly toward the ends of the pulley. These ribs afford large grooves 9, therebetween, and as shown clearly in Fig. 2, the walls 10, of the ribs 8, are spiral shaped. This also is indicated in Figs. 3 and 4, as the distance between the walls 10, in Fig. 4, is less than the distance between walls 10, in Fig. 3. Each rib 8, is also provided with a lip 11, beneath which the material slides through the spiral and inclined grooves and is discharged from the end of the pulley.

As shown in Fig. 5, the pulley as a whole is given an inclination from the central point 12, to the ends 13—14.

The operation is readily seen. When any material falls upon the pulley, it drops into the grooves and owing to the inclination of the walls of the pulley, and the inclined and spiral ribs, the material is very quickly discharged from the pulley. If the material from any cause is not discharged before carried by the pulley opposite the belt, the material cannot injure the belt as it is concealed in the grooves. Also, by providing inclined and spiral grooves, the belt at all times contacts several or parts of several ribs and the belt is held taut and cannot flatten into any groove.

Details of construction may be varied and numerous changes may be made without departing from the principles of this invention, and I therefore do not desire to limit the patent otherwise than necessitated by the prior art.

I claim as my invention:

1. In a pulley of the class described a plurality of correspondingly arranged grooves in the periphery of the pulley, each groove comprising divergent, circumferentially extending portions affording a channel from end to end of the pulley.

2. In a pulley, of the class described a plurality of ribs on the face of the pulley extending from end to end thereof, and forming V-shaped grooves therebetween, the portions of which, at each side of the apex, is gradually increased in width and depth from the apex to the outer end thereof.

3. In a pulley, of the class described a plurality of divergent circumferentially extending ribs on the face of the pulley, and lips extending circumferentially from the outer edges of the ribs.

4. In a pulley, of the class described, a plurality of ribs on the face of the pulley arranged to deflect material toward the ends of the pulley as the pulley is rotated, said ribs being grooved along one side substantially as and for the purpose described.

5. In a device of the class described a pulley having a conveyer belt thereon leaving at one side of the pulley and returning at the other side, as the pulley is rotated, said pulley being provided with grooves in the face thereof adapted when positioned at the return side to discharge material received therein to the ends of the pulley.

6. In a device of the class described a pulley having a conveyer belt thereon leaving at one side of the pulley and returning at the other side as the pulley is rotated, said pulley being provided with divergent flanges on the face thereof engaging the belt, and extending circumferentially so that when they are positioned at the return side, the grooves therebetween incline downwardly to the ends of the pulley and discharge material therein by gravity beyond the edges of the belt.

7. In a device of the class described a pulley having a conveyer belt thereon leaving at one side of the pulley and returning at the other side as the pulley is rotated, and adapted to carry material away from the pulley, divergent ribs on the face of the pulley engaged by the belt and provided with grooves therebetween which, when positioned at the return side, inclined downwardly toward the ends of the pulley so as to discharge material therein, by gravity, beyond the edges of the belt, and circumferentially extending lips at the outer edges of the ribs for retaining the material between the ribs as it is discharging by gravity as aforesaid.

In testimony whereof I have hereunto subscribed my name in the presence of two subscribing witnesses.

WILLIAM J. BLACK.

Witnesses:
 CHARLES W. HILLS, Jr.,
 EARL M. HARDINE.